(12) United States Patent
Kataishi (10) Patent No.: US 12,436,688 B2
(45) Date of Patent: Oct. 7, 2025

(54) IN-VEHICLE ELECTRONIC DEVICE AND LIFE PREDICTION METHOD FOR NONVOLATILE MEMORY

(71) Applicant: Hitachi Astemo, Ltd., Hitachinaka (JP)

(72) Inventor: Tomoyuki Kataishi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/719,134

(22) PCT Filed: Dec. 14, 2021

(86) PCT No.: PCT/JP2021/045984
§ 371 (c)(1),
(2) Date: Jun. 12, 2024

(87) PCT Pub. No.: WO2023/112126
PCT Pub. Date: Jun. 22, 2023

(65) Prior Publication Data
US 2025/0053315 A1 Feb. 13, 2025

(51) Int. Cl.
*G06F 12/00* (2006.01)
*G06F 3/06* (2006.01)

(52) U.S. Cl.
CPC .......... *G06F 3/0619* (2013.01); *G06F 3/0653* (2013.01); *G06F 3/0679* (2013.01)

(58) Field of Classification Search
CPC .... G06F 3/0613; G06F 3/0653; G06F 3/0659; G06F 3/0683
(Continued)

(56) References Cited

U.S. PATENT DOCUMENTS

2014/0136752 A1 5/2014 Terada
2018/0268179 A1* 9/2018 Sato .................. G06K 7/10366

FOREIGN PATENT DOCUMENTS

JP 2014-098978 A 5/2014

OTHER PUBLICATIONS

International Search Report Issued in PCT Application No. PCT/JP2021/045984 dated Feb. 15, 2022, with English Translation.

* cited by examiner

*Primary Examiner* — Mohamed M Gebril
(74) *Attorney, Agent, or Firm* — Foley & Lardner LLP (57) ABSTRACT

Provided is an in-vehicle electronic device including a nonvolatile memory and a heat generating component mounted on one substrate, the in-vehicle electronic device being capable of accurately measuring a temperature of the nonvolatile memory without being affected by a distance from the heat generating component or a use condition. An electronic device mounted on a vehicle includes a processing controller that processes information handled by the electronic device or controls the electronic device, a memory having a plurality of writing areas, a temperature sensor, and a remaining warranty period calculation unit that calculates a remaining warranty period of the memory based on an output from the temperature sensor. The remaining warranty period calculation unit switches between a first determination method for obtaining the remaining warranty period using a first temperature coefficient determined regardless of a distance between the memory and each of a plurality of the temperature sensors and a second determination method for obtaining the remaining warranty period using a second temperature coefficient determined in accordance with the distance between the memory and each of the plurality of the temperature sensors in accordance with a time from activa-
(Continued)

tion of the in-vehicle electronic device to obtain the remaining warranty period.

10 Claims, 4 Drawing Sheets

(58) Field of Classification Search
USPC .......................................................... 711/154
See application file for complete search history.

IN-VEHICLE ELECTRONIC DEVICE AND LIFE PREDICTION METHOD FOR NONVOLATILE MEMORY

TECHNICAL FIELD

The present invention relates to a configuration of an electronic device mounted on a vehicle and control thereof, and particularly relates to a technique effective for application to life prediction of a nonvolatile memory mounted on the electronic device.

BACKGROUND ART

With the progress of autonomous driving (AD) and advanced driver-assistance systems (ADAS), high performance and high reliability of in-vehicle camera systems have become important issues.

An example of an in-vehicle camera used for AD and ADAS is a stereo camera capable of recording also information in a depth direction by simultaneously imaging an object with a plurality of (generally two) cameras from different directions. The sizes, positions, and speeds of the plurality of three-dimensional objects can be detected by stereoscopic processing of the images captured by the plurality of cameras.

A nonvolatile memory (generally, a flash memory) for storing a captured image is mounted on an in-vehicle camera system such as a stereo camera. In order to improve the performance and reliability of the in-vehicle camera system, it is essential to improve the performance and reliability of the nonvolatile memory.

Incidentally, since the nonvolatile memory is deteriorated by electrons through which an oxide film serving as an insulator penetrates in an operation principle, a number of times that data is rewritten is limited, and the life of the nonvolatile memory varies depending on the number of rewriting times.

Further, it is known that the number of rewriting times of the nonvolatile memory varies depending on a temperature during use. In general, in a case of use at a high temperature, the number of rewriting times is reduced.

Therefore, the life of the nonvolatile memory can be predicted based on the number of rewriting times and the temperature during the use of the nonvolatile memory.

In addition, the nonvolatile memory (flash memory) is roughly classified into a NOT-OR (NOR) type memory and a NOT-AND (NAND) type memory. However, when the both types of flash memories having the same capacity are compared, the NAND type memory has lower data holding characteristics than the NOR type memory, but is relatively low in cost. Therefore, if the life of the NAND flash memory can be accurately predicted, a low-cost in-vehicle camera system using the NAND type flash memory can be provided.

An example of the background art of the present technical field includes a technique as disclosed in PTL 1. PTL 1 discloses "a memory control device capable of appropriately leveling the degree of consumption in a nonvolatile memory".

CITATION LIST

Patent Literature

PTL 1: JP 2014-98978 A

SUMMARY OF INVENTION

Technical Problem

In the in-vehicle camera system as described above, generally, a heat generating component such as a microcomputer equipped with an image recognition processing function is also mounted on a substrate where the nonvolatile memory is mounted, and the temperature at which the nonvolatile memory is exposed varies depending on a distance from the heat generating component to the memory on the substrate.

Further, the temperature of the nonvolatile memory is difficult to accurately measure because the manner of heat generation in the heat generating component varies depending on a use condition of the in-vehicle camera system. That is, the life of the nonvolatile memory is difficult to accurately predict.

In PTL 1 described above, a temperature sensor is provided in each of a plurality of memory cells, a priority of each memory cell is determined in accordance with measured temperatures, and writing processing is executed preferentially on a memory cell having a high priority as a data writing destination. The degree of consumption can be appropriately leveled in the nonvolatile memory.

However, PTL 1 does not describe any influence of the heat generating component on the same substrate as described above, and the life of the nonvolatile memory is difficult to accurately predict.

Therefore, an object of the present invention is to provide an in-vehicle electronic device including a nonvolatile memory and a heat generating component mounted on one substrate, the in-vehicle electronic device being capable of accurately measuring a temperature of the nonvolatile memory without being affected by a distance from the heat generating component to the memory and a use condition, and a life prediction method for the nonvolatile memory using the in-vehicle electronic device.

Solution to Problem

In order to solve the above problem, the present invention provides an in-vehicle electronic device mounted on a vehicle, the in-vehicle electronic device including a processing controller that processes information handled by the in-vehicle electronic device or controls the in-vehicle electronic device, a memory having a plurality of writing areas, a temperature sensor, and a remaining warranty period calculation unit that calculates a remaining warranty period of the memory based on an output from the temperature sensor. The remaining warranty period calculation unit switches between a first determination method for obtaining the remaining warranty period using a first temperature coefficient determined regardless of a distance between the memory and each of a plurality of the temperature sensors and a second determination method for obtaining the remaining warranty period using a second temperature coefficient determined based on the distance between the memory and each of the plurality of the temperature sensors in accordance with a time from activation of the in-vehicle electronic device to obtain the remaining warranty period.

The present invention also provides a life prediction method for a nonvolatile memory, the method including (a) comparing an elapsed time from activation of an in-vehicle electronic device with a predetermined threshold, (b) calculating a remaining warranty period of the memory using a first temperature coefficient determined regardless of a distance between the memory and each of a plurality of temperature sensors, and (c) calculating a remaining warranty period of the memory using a second temperature coefficient determined in accordance with the distance between the memory and each of the plurality of temperature sensors. The remaining warranty period of the memory is obtained by switching between the steps (b) and (c) in accordance with a time after the activation of the in-vehicle electronic device.

Advantageous Effects of Invention

According to the present invention, in the in-vehicle electronic device including the nonvolatile memory and the heat generating component mounted on one substrate, it is possible to implement the in-vehicle electronic device that can accurately measure a temperature of the nonvolatile memory without being affected by the distance from the heat generating component to the memory and a use condition, and the life prediction method for the nonvolatile memory using the in-vehicle electronic device.

Accordingly, the reliability of the nonvolatile memory and the in-vehicle electronic device using the nonvolatile memory can be improved.

Further, instead of the NOR flash memory, the NAND flash memory having the same capacity can be used, which can contribute to cost reduction of the in-vehicle electronic device.

Problems, configurations, and effects other than those described above will be clarified by the following description of embodiments.

DESCRIPTION OF EMBODIMENTS

Hereinafter, embodiments of the present invention will be described with reference to the drawings. In the drawings, identical components are denoted by identical reference numerals, and the detailed description of overlapping components is omitted.

Further, an example of a mounting substrate mounted on an in-vehicle camera system will be described below, but the present invention is not limited thereto, and can also be applied to an in-vehicle electronic device for another application having a substrate on which a nonvolatile memory and a heat generating component are mounted. Therefore, illustration of a configuration as an in-vehicle camera is omitted.

First Embodiment

Figure 1:
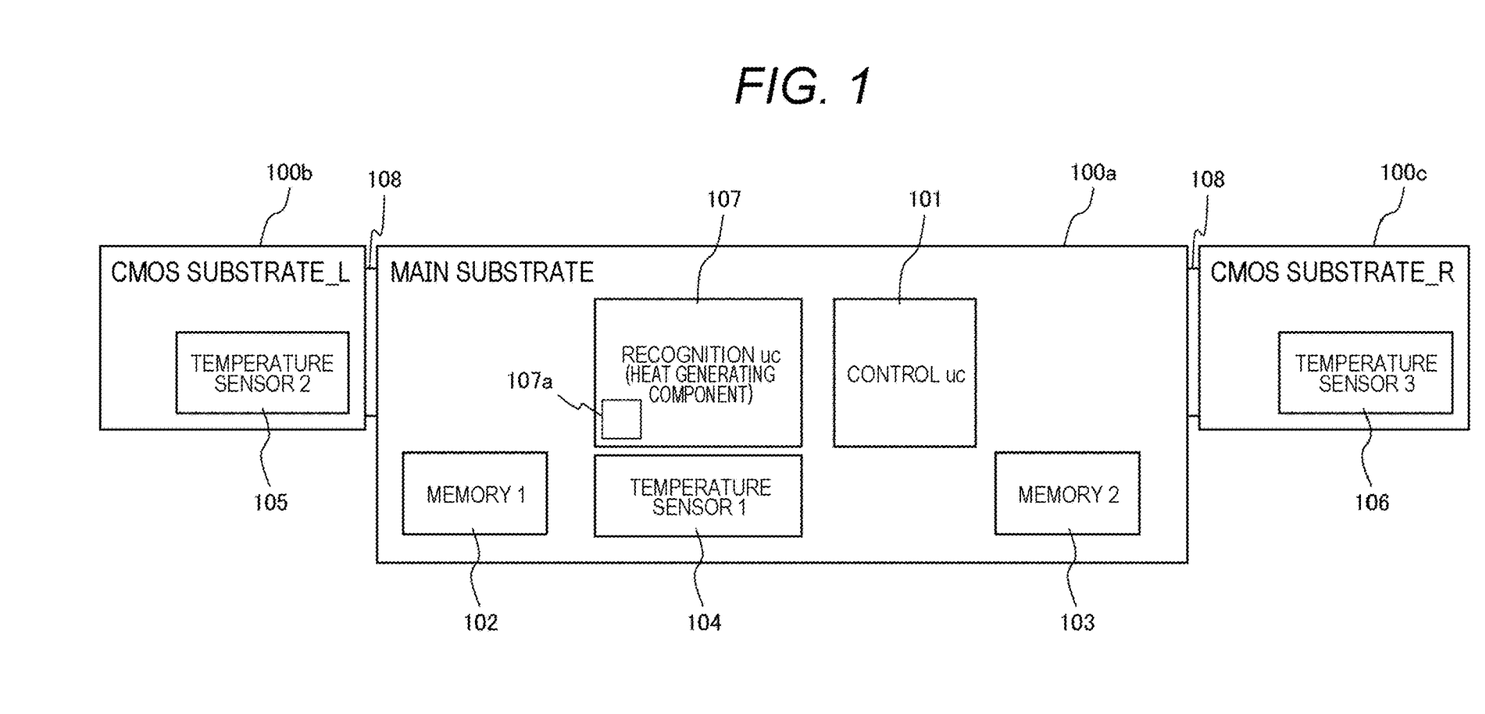
FIG. 1 is a diagram illustrating a substrate of an in-vehicle electronic device according to a first embodiment of the present invention.
Figure 2:
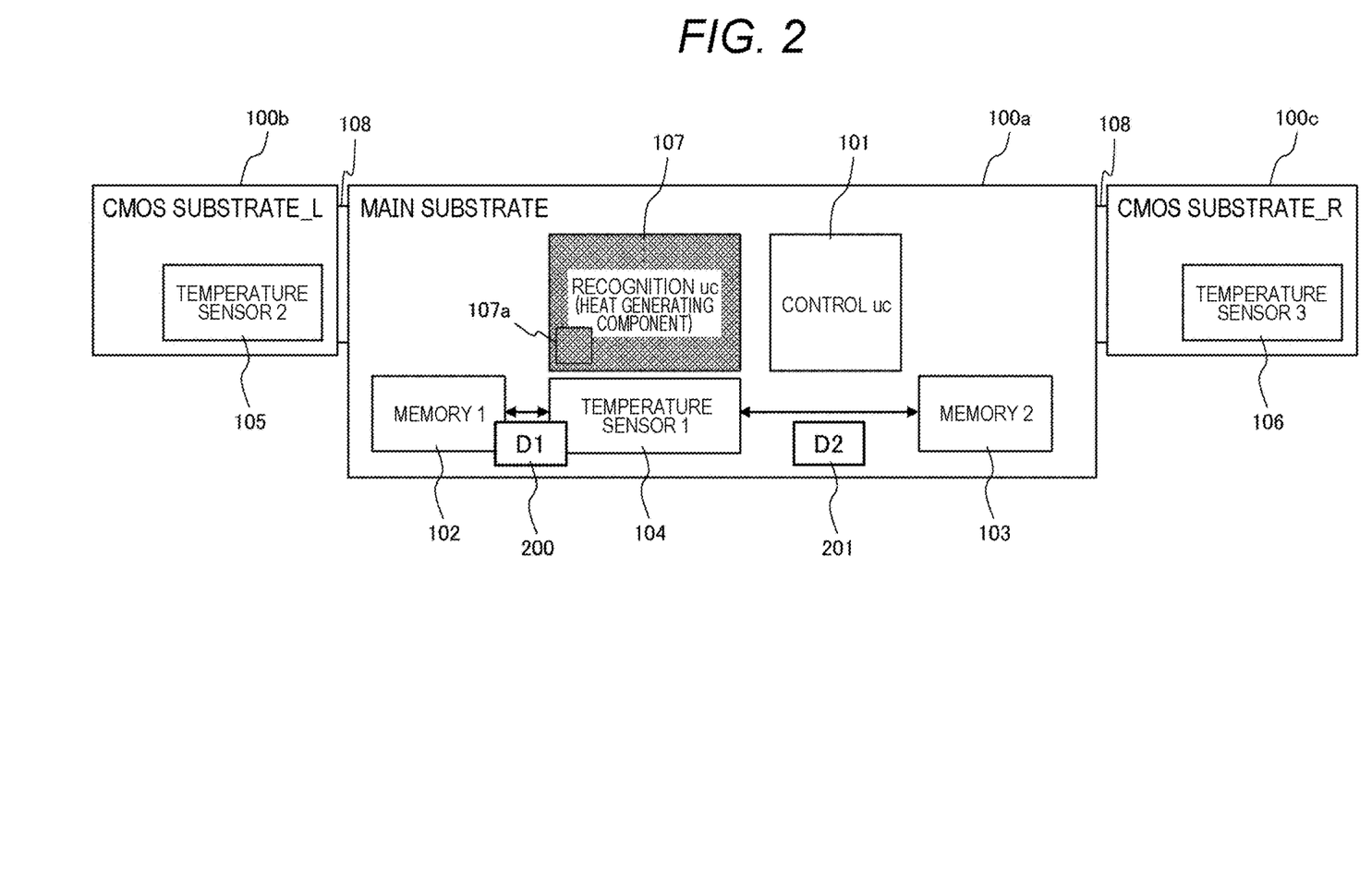
FIG. 2 is a diagram illustrating distances between temperature sensors and a nonvolatile memory on the substrate of FIG. 1.
Figure 3:
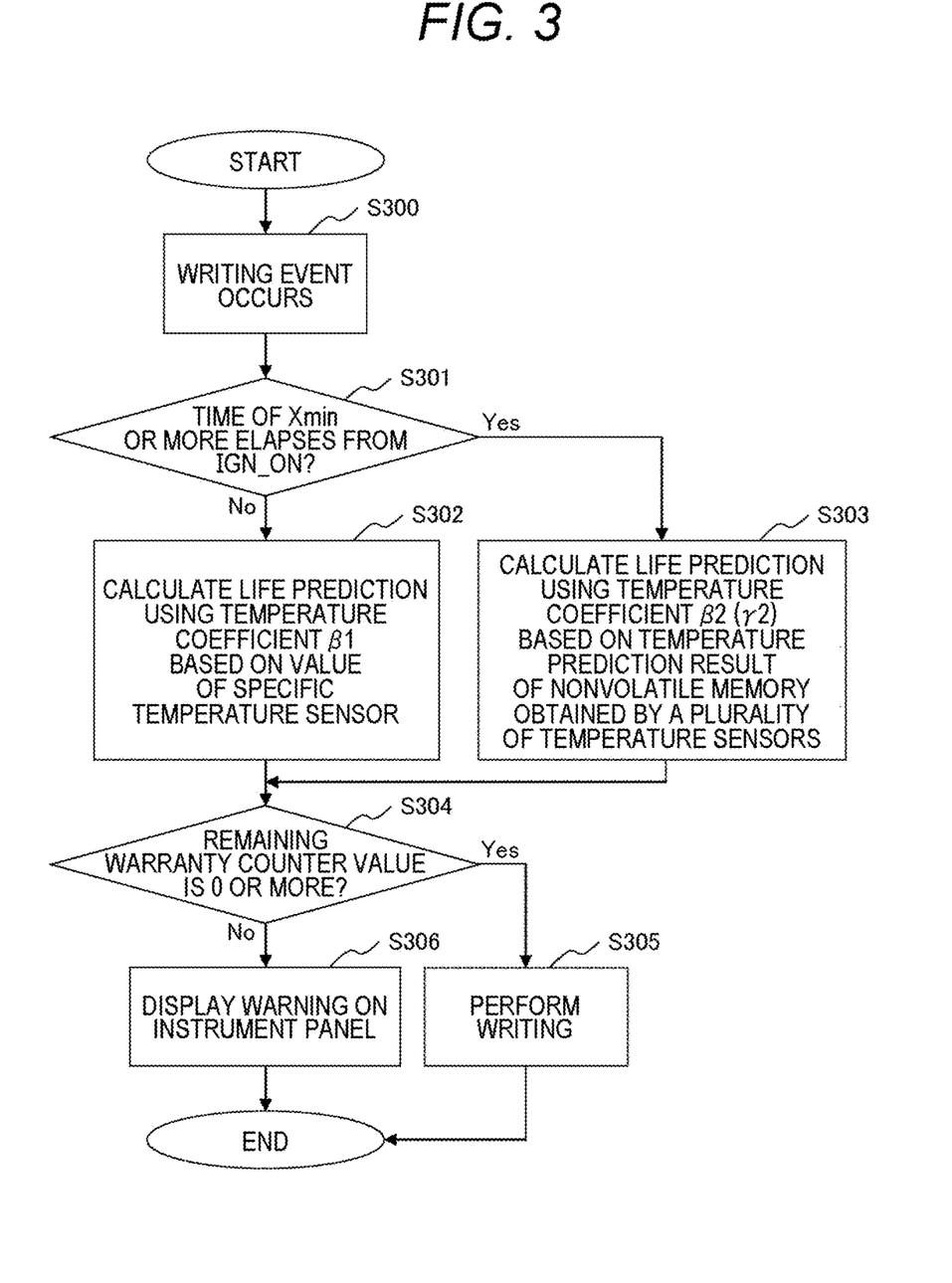
FIG. 3 is a flowchart illustrating a memory life prediction method for the in-vehicle electronic device according to the first embodiment of the present invention.

An in-vehicle electronic device according to a first embodiment of the present invention and a life prediction method for a nonvolatile memory using the electronic device will be described with reference to FIGS. 1 to 3. FIG. 1 is a diagram illustrating a substrate of the in-vehicle electronic device according to the present embodiment. FIG. 2 is a diagram illustrating distances between temperature sensors and the nonvolatile memory on the substrate of FIG. 1. FIG. 3 is a flowchart illustrating a memory life prediction method for the in-vehicle electronic device according to the present embodiment.

As illustrated in FIG. 1, the in-vehicle electronic device of the present embodiment includes a main substrate 100a, and a complementary metal oxide semiconductor (CMOS) substrate (L) 100b and a CMOS substrate (R) 100c disposed on the left and right of the main substrate 100a. The main substrate 100a, the CMOS substrate (L) 100b, and the CMOS substrate (R) 100c are connected by a connection cable 108.

The main substrate 100a includes a processing controller (control microcomputer) 101 that processes information handled by the in-vehicle electronic device or controls the in-vehicle electronic device, memories 102 and 103 each having a plurality of writing areas, a temperature sensor 104, and a recognition microcomputer 107 that is a heat generating component.

The recognition microcomputer 107 includes a remaining warranty period calculation unit 107a as a part of the function. The remaining warranty period calculation unit 107a calculates the remaining warranty periods of the memory 102 and the memory 103 based on an output from the temperature sensor 104. The CMOS substrate (L) 100b includes a temperature sensor 105, and the CMOS substrate (R) 100c includes a temperature sensor 106.

Here, in the in-vehicle electronic device according to the present embodiment, the remaining warranty period calculation unit 107a switches between a first determination method for obtaining the remaining warranty periods of the memories 102 and 103 using a first temperature coefficient determined regardless of distances between the memories 102, 103 and the plurality of temperature sensors 104, 105, 106 and a second determination method for obtaining the remaining warranty periods of the memories 102 and 103 using a second temperature coefficient determined in accordance with the distances between the memories 102, 103 and the plurality of temperature sensors 104, 105, 106 to determine the remaining warranty periods.

Hereinafter, the first determination method and the second determination method will be described in detail.

In the first determination method, the remaining warranty periods of the memories 102 and 103 are calculated by using the following formulas (1) and (2). The calculation formula of the first determination method are applied under a situation of less than Xmin (for example, less than 1 minute) immediately after the activation of the in-vehicle electronic device.

[Mathematical formula 1]

$$W_{post} = W_{pre} - (W_{curr} * \beta_1) \qquad (1)$$

Here, $W_{post}$ indicates a remaining warranty counter value, $W_{pre}$ indicates a previous remaining warranty counter value, $W_{curr}$ indicates a counter value for current writing, and $\beta_1$ indicates a temperature coefficient.

[Mathematical formula 2]

$$\beta_1 = (T_1 - 298)/298 \quad (2)$$

Here, $T_1$ indicates, for example, a temperature [K] of the temperature sensor 1 (104).

In the second determination method, the calculation method is optimized by the distances from the recognition microcomputer 107, which is the heat generating component, to the memories 102 and 103. In the second determination method, the remaining warranty periods of the memories 102 and 103 are calculated by using the following formulas (3), (4), (5), and (6). The calculation formulas of the second determination method are applied under a situation where Xmin or more (for example, 1 or more minutes) elapses immediately after the activation of the in-vehicle electronic device.

[Mathematical formula 3]

$$W_{post\_1} = W_{pre\_1} - (W_{curr\_1} * \beta_2) \quad (3)$$

Here, $W_{post\_1}$ indicates a remaining warranty counter value of the memory 1 (102), $W_{pre\_1}$ indicates a previous remaining warranty counter value of the memory 1 (102), $W_{curr\_1}$ indicates a counter value for current writing on the memory 1 (102), and $\beta_2$ indicates a temperature coefficient of the memory 1 (102).

[Mathematical formula 4]

$$\beta_2 = \left(T_1 - \left(T_{123} * \left(\frac{D_1}{D_{123}}\right)\right) - 298\right) \Big/ 298 \quad (4)$$

Here, $T_1$ indicates, for example, a temperature [K] of the temperature sensor 1 (104), $T_{123}$ indicates a temperature difference [K] between the temperature sensor 1 (104) with maximum temperature and the temperature sensor 2 (105) or the temperature sensor 3 (106) with minimum temperature, $D_1$ indicates a distance [m] from the temperature sensor 1 (104) to the memory 1 (102), and $D_{123}$ indicates a distance [m] from the temperature sensor 1 (104) with maximum temperature to the temperature sensor 2 (105) or the temperature sensor 3 (106) with minimum temperature.

[Mathematical formula 5]

$$W_{post\_2} = W_{pre\_2} - (W_{curr\_2} * \gamma_2) \quad (5)$$

Here, $W_{post\_2}$ indicates a remaining warranty counter value of the memory 2 (103), $W_{pre\_2}$ indicates a previous remaining warranty counter value of the memory 2 (103), $W_{curr\_2}$ indicates a counter value for current writing on the memory 2 (103), and $\gamma_2$ indicates a temperature coefficient of the memory 2 (103).

[Mathematical formula 6]

$$\gamma_2 = \left(T_1 - \left(T_{123} * \left(\frac{D_2}{D_{123}}\right)\right) - 298\right) \Big/ 298 \quad (6)$$

Here, $D_2$ indicates a distance [m] from the temperature sensor 1 (104) to the memory 2 (103).

The memory life prediction method for the in-vehicle electronic device according to the present embodiment will be described with reference to FIG. 3.

First, the recognition microcomputer (heat generating component) 107 measures the activation time. In step S300, a writing event (for example, IGN_ON) for the memories 102 and 103 occurs, and a determination is made in step S301 whether a time of less than a predetermined threshold Xmin elapses (for example, less than 1 minute).

If the time of less than Xmin (No) elapses, in step S302, a remaining warranty counter value is calculated by using the temperature coefficient $\beta_1$ (first temperature coefficient). (The first determination method) In a case where a time of Xmin or more elapses (Yes), in step S303, the remaining warranty counter value is calculated by using $\beta_2$, $\gamma_2$ (the second temperature coefficient). (The second determination method) Subsequently, a determination is made in step S304 whether the remaining warranty counter value is 0 or more.

If the remaining warranty counter value is 0 or more (Yes), writing to the memories 102 and 103 is performed in step S305.

On the other hand, in a case where the value is less than 0 (No), a warning is displayed on an instrument panel in step S306 and is notified to a driver.

As described above, the in-vehicle electronic device according to the present embodiment is an electronic device mounted on a vehicle including the processing controller (control microcomputer) 101 that processes information handled by the electronic device or controls the electronic device, the memories 102 and 103 each having a plurality of writing areas, the temperature sensors 104, 105, and 106, and the remaining warranty period calculation unit 107*a* that calculates the remaining warranty periods of the memories 102 and 103 based on outputs from the temperature sensors 104, 105, and 106. The remaining warranty period calculation unit 107*a* switches between the first determination method for obtaining the remaining warranty periods using the first temperature coefficient $\beta_1$ determined regardless of the distances between the memories 102, 103 and the plurality of temperature sensors 104, 105, 106 and the second determination method for obtaining the remaining warranty periods using the second temperature coefficient $\beta_2$ ($\gamma_2$) determined in accordance with the distances between the memories 102, 103 and the plurality of temperature sensors 104, 105, 106 in accordance with the time elapsed from the activation of the in-vehicle electronic device to obtain the remaining warranty periods.

The timing for switching between the first determination method and the second determination method is determined, for example, based on an elapsed time (Xmin or more; for example, 1 minute or more) from ignition-on of the vehicle. That is, the remaining warranty periods are calculated with the first determination method during the period from the ignition-on of the vehicle to the predetermined time, and the remaining warranty periods are calculated with the second determination method after the predetermined time elapses from the ignition-on of the vehicle.

Further, the in-vehicle electronic device of the present embodiment includes the heat generating component (recognition microcomputer) 107 whose temperature rises with the activation of the in-vehicle electronic device, and the second temperature coefficient $\beta_2$ ($\gamma_2$) is determined in accordance with the distances between the temperature sensor 104 disposed closest to the heat generating component (recognition microcomputer) 107 and the memories 102 and 103.

In the in-vehicle electronic device and the life prediction method for the nonvolatile memory of the present embodiment, the life prediction is performed in consideration of the temperature coefficient. That is, the temperature of the nonvolatile memory is estimated by using the plurality of temperature sensors 104, 105, and 106 and is used for life calculation. Division of the use conditions (for example, "immediately after activation" and "after elapse of a certain period of time") makes it possible to improve the accuracy of estimation of an exposure temperature in the nonvolatile memory. Therefore, since the manner of a temperature rise is different between immediately after the activation of the in-vehicle electronic device and after the elapse of time even in summer and winter, the life of the nonvolatile memory can be accurately predicted by performing the life prediction using the temperature coefficient.

Further, it is possible to effectively utilize a NOT-AND (NAND) flash memory that is comparatively inexpensive but has a short life (low data holding characteristics) instead of a NOT-OR (NOR) flash memory that has high data holding characteristics but is comparatively expensive.

The nonvolatile memory can be effectively used by managing the temperature for each memory and each sector and calculating the remaining warranty period, and a large amount of data can be handled with a minimum necessary amount of a memory.

The nonvolatile memory can be used without corruption of data even in applications where data is frequently rewritten, such as a drive recorder.

Use of the in-vehicle electronic device of the present embodiment in, for example, an in-vehicle camera system improves the reliability of the in-vehicle camera system, and enables use of an NAND flash memory having the same capacity instead of the NOR flash memory, thus contributing to cost reduction of the in-vehicle camera system.

Note that, the above description has referred to the two cases where the memory 1 (102) and the memory 2 (103) are used. However, also in a case of three or more memories, the remaining warranty counter values can be calculated if the distances to memories are obtained.

Further, although the temperature sensor 1 (104) is disposed near the recognition microcomputer 107, which is the heat generating component, the life of each memory can be predicted by measuring a temperature gradient in the main substrate 100a in advance and acquiring measurement data without disposing the temperature sensor 1 near the heat generating component.

In addition, although the three temperature sensors (104, 105, and 106) are mounted, even in a case of one temperature sensor, the life can be predicted by acquiring data of a temperature distribution in advance after lapse of a time or in accordance with a surrounding situation.

However, the conditions after the lapse of time, the conditions of the surrounding situation, and the information processing amount inside the in-vehicle electronic device are wide-ranging, and many conditions for data acquisition are present. Thus, it is desirable to mount three or more temperature sensors inside the in-vehicle electronic device.

Further, in the present embodiment, it is assumed that one heat generating component is provided. However, even in a case where a plurality of heat generating components is provided, the present invention can be applied even to the case of the plurality of heat generating components by obtaining the temperature distribution in the main substrate 100a in advance.

Further, in the present embodiment, the remaining warranty period is obtained by using the first temperature coefficient $\beta_1$ in the first determination method, and the remaining warranty period is obtained by using the second temperature coefficient $\beta_2$ ($\gamma_2$) in the second determination method. However, a conversion table is created in advance by acquiring a relationship between a temporal temperature change in the heat generating component and the number of rewriting times (life) for the nonvolatile memory with, for example, experiment or simulation without using the temperature coefficients, and the method for calculating the remaining warranty period with the remaining warranty period calculation unit 107a can be switched in accordance with the elapsed time after the activation of the in-vehicle electronic device.

Second Embodiment

Figure 4:
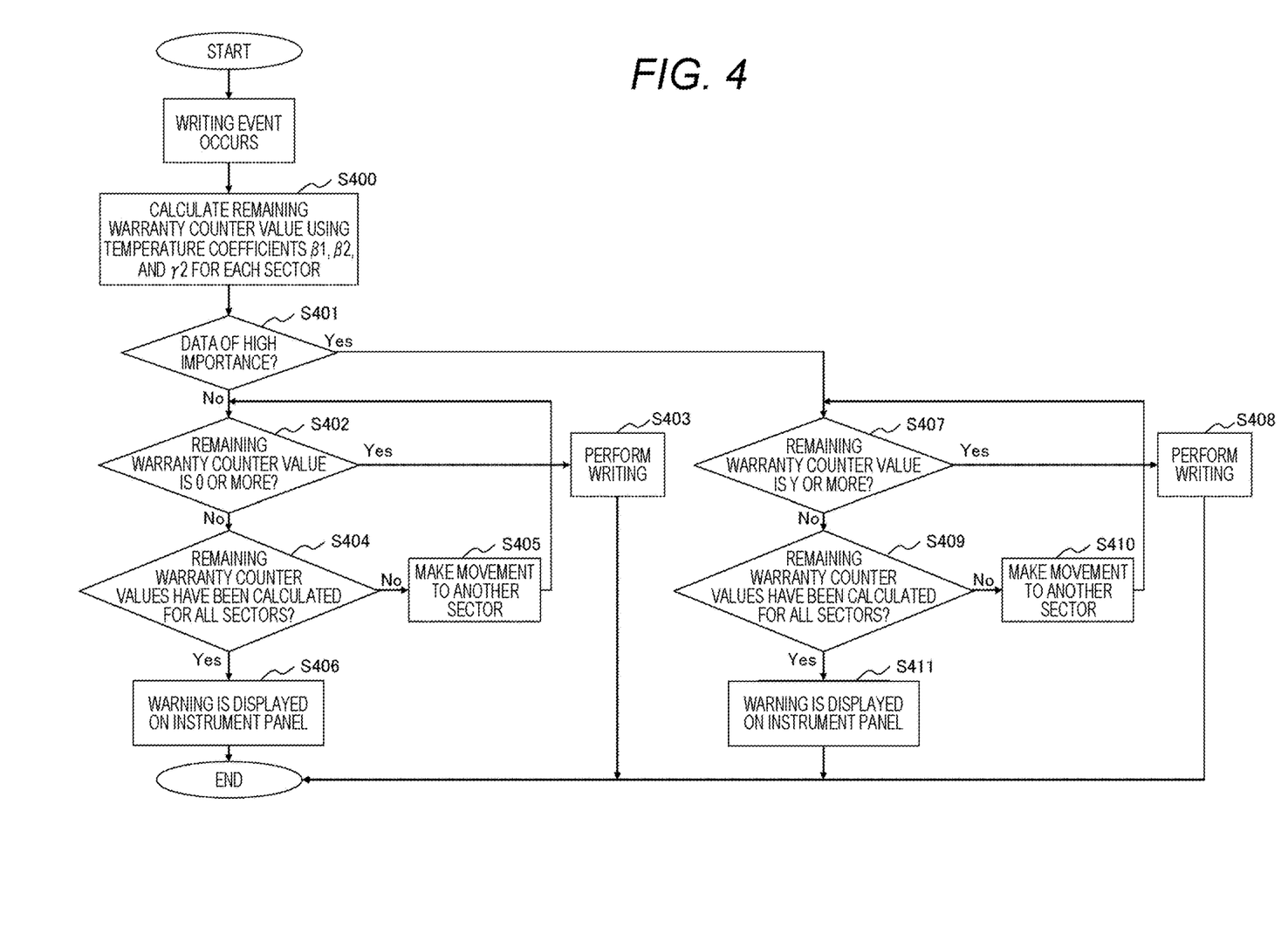
FIG. 4 is a flowchart illustrating a memory life prediction method for an in-vehicle electronic device according to a second embodiment of the present invention.

An in-vehicle electronic device and a life prediction method for a nonvolatile memory using the in-vehicle electronic device according to a second embodiment of the present invention will be described with reference to FIG. 4. FIG. 4 is a flowchart illustrating the memory life prediction method for the in-vehicle electronic device according to the present embodiment.

The present embodiment describes a method for reliably writing data of high importance to a sector (area) without corruption of data by utilizing the remaining warranty counter value calculated in the first embodiment.

After the writing event (for example, IGN_ON) to the memories 102 and 103 occurs, first, in step S400, the remaining warranty counter value is calculated by using the temperature coefficients $\beta_1$, $\beta_2$, and $\gamma_2$ for each sector.

Next, in step S401, a determination is made whether data has high importance. Examples of the "data of high importance" referred to herein include, in the case of an in-vehicle camera, information related to safety, such as "image during occurrence of pre-crash brake", "other vehicle recognition information during occurrence of pre-crash brake", and "sign recognition information during occurrence of pre-crash brake", and, in the case of an in-vehicle radar, "distance to an object during occurrence of pre-crash brake" and "vehicle speed information about a brake target during occurrence of pre-crash brake".

In the case of data of low importance (No), a check is conducted in step S402 whether the remaining warranty counter value in a saving sector is 0 or more.

In a case where the remaining warranty counter value is 0 or more (Yes), the writing to the memories 102 and 103 is performed in step S403.

On the other hand, in a case where the remaining warranty counter value is less than 0 (No), a check is conducted in step S404 whether the remaining warranty counter values in all sectors have been calculated.

In a case where not all the remaining warranty counter values in all the sectors have been calculated (No), a movement to another sector is made in step S405, the processing returns to step S402, and the remaining warranty counter values are checked again.

In a case where the remaining warranty counter values have been calculated in all the sectors (Yes), a warning is displayed on the instrument panel in step S406, and is notified to the driver.

In a case where the determination is made in step S401 that the data has high importance (Yes), a check is conducted in step S407 whether the remaining warranty counter value in the saving sector is equal to or greater than a predetermined threshold Y.

In a case where the value is equal to or greater than Y (Yes), the writing to the memories 102 and 103 is performed in step S408.

On the other hand, in a case where the remaining warranty counter value is less than Y (No), a check is conducted in step S409 whether the remaining warranty counter values in all sectors have been calculated.

In a case where not all the remaining warranty counter values in all the sectors have been calculated (No), a movement to another sector is made in step S410, the processing returns to step S407, and the remaining warranty counter values are checked again.

In a case where the remaining warranty counter values have been calculated in all the sectors (Yes), a warning is displayed on the instrument panel in step S411, and is notified to the driver.

According to the present embodiment, since the writing is performed in consideration of the remaining warranty counter values and the importance of the data for each sector (area) of the nonvolatile memory, data of high importance can be written in a sector (area) having a high remaining warranty counter value (data holding characteristic), and the reliability of the nonvolatile memory and the in-vehicle electronic device using the memory can be improved.

As described above, although the remaining warranty counter values are calculated after the movement of sectors in step S405 or step S410, the remaining warranty counter values in all the sectors may be calculated in advance, and the information (storage area) may be held in the memories 102 and 103.

As a result, in a case where a writing event of data with high importance occurs, if the sector where data is scheduled to be stored has a remaining warranty counter value of less than Y, the sector can be immediately swapped (exchanged) with a sector having the largest remaining warranty counter value that is equal to or more than Y.

As described above, in the in-vehicle electronic device of the present embodiment, the remaining warranty period is calculated for each of the plurality of writing areas in the nonvolatile memory, the priority of the information to be written in the nonvolatile memory is determined, and the information of high importance is preferentially written.

Thus, data of high importance can be reliably stored by calculating the life prediction for each sector instead of the life prediction for each nonvolatile memory.

Note that the present invention is not limited to the above-described embodiments, and includes various modifications. For example, the above-described embodiments have been described in detail for easy understanding of the present invention, and are not necessarily limited to those having all the described configurations. Further, a part of the configuration of a certain embodiment can be replaced with the configuration of another embodiment, and the configuration of another embodiment can be added to the configuration of a certain embodiment. Further, another configuration can be added to or deleted from a part of the configuration of each embodiment, or a part of the configuration of each embodiment can be replaced with another configuration.

REFERENCE SIGNS LIST 100a main substrate
100b CMOS substrate (L)
100c CMOS substrate (R)
101 processing controller (control microcomputer)
102 memory 1
103 memory 2
104 temperature sensor 1
105 temperature sensor 2
106 temperature sensor 3
107 recognition microcomputer (heat generating component)
107a remaining warranty period calculation unit
108 connection cable
200 distance D1 between temperature sensor 1 and memory 1
201 distance D2 between temperature sensor 1 and memory 2

The invention claimed is:

1. An in-vehicle electronic device mounted on a vehicle, the in-vehicle electronic device comprising:
    a processing controller that processes information handled by the in-vehicle electronic device or controls the in-vehicle electronic device;
    a memory having a plurality of writing areas;
    a temperature sensor; and
    a remaining warranty period calculation unit that calculates a remaining warranty period of the memory based on an output from the temperature sensor, wherein the remaining warranty period calculation unit switches between a first determination method for obtaining the remaining warranty period using a first temperature coefficient determined regardless of a distance between the memory and each of a plurality of the temperature sensors and a second determination method for obtaining the remaining warranty period using a second temperature coefficient determined in accordance with the distance between the memory and each of the plurality of the temperature sensors in accordance with a time from activation of the in-vehicle electronic device to obtain the remaining warranty period.

2. The in-vehicle electronic device according to claim 1, wherein the remaining warranty period is calculated for each of the plurality of writing areas, and
    wherein the in-vehicle electronic device determines a priority of information to be written to the memory, and preferentially writes information of high importance.

3. The in-vehicle electronic device according to claim 1, wherein the remaining warranty period is calculated with the first determination method during a period from ignition-on of the vehicle to a predetermined time, and
    wherein the remaining warranty period is calculated with the second determination method after the predetermined time elapses from the ignition-on of the vehicle.

4. The in-vehicle electronic device according to claim 1, further comprising a heat generating component whose temperature rises with activation of the in-vehicle electronic device,
    wherein the second temperature coefficient is determined in accordance with the distance: from the temperature sensor disposed closest to the heat generating component to the memory.

5. The in-vehicle electronic device according to claim 1, wherein the memory is a nonvolatile memory that stores an image captured by an in-vehicle camera.

6. A life prediction method for a nonvolatile memory, the method comprising:
    (a) comparing an elapsed time from activation of an in-vehicle electronic device with a predetermined threshold;

(b) calculating a remaining warranty period of a memory using a first temperature coefficient determined regardless of a distance between the memory and each of a plurality of temperature sensors; and (c) calculating the remaining warranty period of the memory using a second temperature coefficient determined in accordance with the distance between the memory and each of the plurality of temperature sensors, wherein the remaining warranty period of the memory is obtained by switching between the steps (b) and (c) in accordance with a time after the activation of the in-vehicle electronic device.

7. The life prediction method for the nonvolatile memory according to claim 6, wherein the remaining warranty period is calculated for each of the plurality of writing areas, the method further comprising:

determining a priority of information to be written to the memory; and preferentially writing information of high importance.

8. The life prediction method for the nonvolatile memory according to claim 6, wherein the remaining warranty period is calculated in the step (b) during a period from ignition-on of the vehicle to a predetermined time, and wherein the remaining warranty period is calculated in the step (c) after a predetermined time elapses from the ignition-on of the vehicle.

9. The life prediction method for the nonvolatile memory according to claim 6, wherein the second temperature coefficient is determined in accordance with a distance between the memory and the temperature sensor disposed closest to a heat generating component whose temperature rises with activation of the in-vehicle electronic device.

10. The life prediction method for the nonvolatile memory according to claim 6, wherein the memory is a nonvolatile memory that stores a captured image of an in-vehicle camera.

* * * * *